A. MILLER.

Assignor to C. H WATERS & CO.

BAILS AND EARS FOR BUCKETS.

Reissued Jan. 30, 1877.

No. 7,483.

WITNESSES

C. S. Nottingham

Albert H. Bright

INVENTOR

Alfred Miller.

By Leggett & Leggett.

Attorney

N. PETERS, PHOTO-LITHOGRAPHER, WASHINGTON, D. C.

UNITED STATES PATENT OFFICE.

ALFRED MILLER, OF CINCINNATI, OHIO, ASSIGNOR TO CHAS. H. WATERS & CO.

IMPROVEMENT IN BAILS AND EARS FOR BUCKETS.

Specification forming part of Letters Patent No. 149,594, dated April 14, 1874; reissue No. 7,483, dated January 30, 1877; application filed February 28, 1876.

*To all whom it may concern:*

Be it known that I, ALFRED MILLER, of Cincinnati, in the county of Hamilton and State of Ohio, have invented certain new and useful Improvements in Bails and Ears for Buckets; and I do hereby declare the following to be a full, clear, and exact description of the invention, such as will enable others skilled in the art to which it pertains to make and use it, reference being had to the accompanying drawings, which form part of this specification.

My invention relates to improvements in bucket bails and ears.

Figure 1:
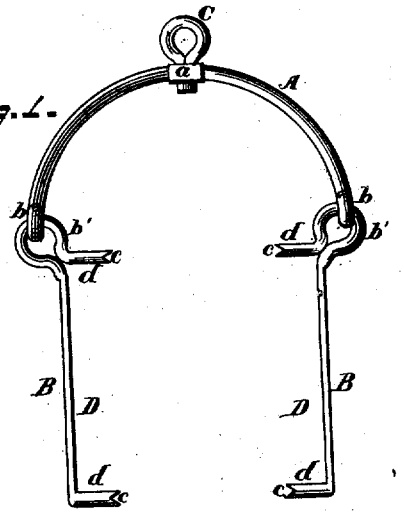
Figure 2:
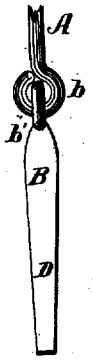

In the drawings, Figure 1 represents a side elevation of the invention complete; Fig. 2, a detached view of an ear.

The bail A, constructed preferably of metal, has a loop, *b*, formed at each end of the same, and the bail is also provided at its center with a swivel-loop, C, for the attachment of a cord or chain.

Heretofore the bail has been flattened at its central portion for the attachment of a swivel-loop; but such construction materially weakens the bail at a point where it is subjected to the greatest wear and strain.

To remedy the defects above noted the bail A is re-enforced at its center by welding a separate rod, *a*, thereto, which is thereafter flattened by a punch, or in any other suitable way, and then punched for the reception and attachment of the shank of the swivel-loop C. The ears B B are each constructed of one piece of metal, the upper end of the same being bent backward and then forward to form a loop, *b'*, while the extreme end of the ear projects beyond the body of the same, and at about right angles thereto, to form a prong, *d*, which serves to secure the upper end of the ear to the bucket or other receptacle. The central portion D of the ear is preferably made flat, that it may closely fit the sides of the bucket or cask. The lower portion of the ear is also bent inwardly to form a prong, *d*. The said upper and lower prongs are driven into the cask, bucket, or keg.

The ends of the prongs *d* may be notched, as shown at *c*, in order that the inner end of the prong may be clinched against the inner surface of the bucket, after the prongs are driven into the same.

The ears are attached to the opposite sides of a bucket, keg, or cask by driving the prongs *d* through the bucket, the upper prong being driven in near the rim, and the lower one a short distance down the side of the bucket or cask.

To insure against possible detachment of the ears from the bucket or cask, the projecting ends of the ear may be clinched or swaged against the interior surface of the receptacle.

Having fully described my invention, what I claim, and desire to secure by Letters Patent, is—

1. A bail-ear having two lateral prongs, and formed of a single piece of metal, the upper prong and the body of the ear being directly connected by a single loop, constructed substantially as and for the purpose set forth.

2. As an article of manufacture, the combined bucket bail and ear herein described, the latter constructed of flat iron, with its lower end rounded to pass through the side of the bucket, and the other end rounded and bent upon itself to form a loop, and terminating in a prong constructed to pass through the side of the bucket, substantially as described.

3. The bail A, re-enforced at its central portion for the attachment of a swivel-loop, substantially as and for the purpose specified.

4. The combination, with the bail A, re-enforced at *a*, of the swivel-loop C, substantially as and for the purpose set forth.

ALFRED MILLER.

Witnesses:

THOS. B. HALL,

E. J. NOTTINGHAM.